Dec. 6, 1949 E. C. SHAW 2,490,165
LOG DEBARKING MACHINE
Filed April 17, 1944 3 Sheets-Sheet 1

Inventor
E. C. Shaw
by William S. Gile
Attorney

Dec. 6, 1949 — E. C. SHAW — 2,490,165
LOG DEBARKING MACHINE
Filed April 17, 1944 — 3 Sheets-Sheet 2

Inventor
E. C. Shaw
by William L. Gates
Attorney

Dec. 6, 1949 E. C. SHAW 2,490,165
LOG DEBARKING MACHINE
Filed April 17, 1944 3 Sheets-Sheet 3

Inventor
E. C. Shaw
by William S. Gates
Attorney

Patented Dec. 6, 1949

2,490,165

UNITED STATES PATENT OFFICE 2,490,165

LOG DEBARKING MACHINE

Ernest C. Shaw, Milwaukee, Wis., assignor to Allis-Chalmers Manufacturing Company, Milwaukee, Wis., a corporation of Delaware Application April 17, 1944, Serial No. 531,341

3 Claims. (Cl. 144—208)

This invention relates to apparatus for the removal of bark and for foreign material from logs or other pieces of material.

It is already known in the art to decorticate, or debark and clean logs by mechanical cutting and grinding and by the mechanical action of a jet of water or other fluid at high velocity; and it also is known to rotate and transport the logs on a pair of parallel rolls with the logs held in the crotch of the rolls by gravity and the pressure of the fluid jet as shown in the patent to E. C. Shaw and W. G. Hagmaier U. S. 2,338,136.

This invention consists primarily in an improvement in log barking apparatus of the type shown in the above mentioned patent in which the applicant is a joint inventor.

More particularly the invention provides an improved roll structure.

Another feature is the unitary combination of a roll and cleaning tool for conveying and cleaning objects.

An object of the invention is to provide in a log debarking machine improved log transferring and debarking and cleansing mechanism.

Another object is to reduce to a minimum the number of relatively moving parts in a machine for debarking and cleansing logs.

Another object is to provide an improved log rotating and conveying mechanism.

The invention having the above mentioned features and objects, and other objects which may appear from a reading of the specification may be carried into practical effect as fully described hereinbelow with reference to the accompanying drawings, in which.

Figure 1:
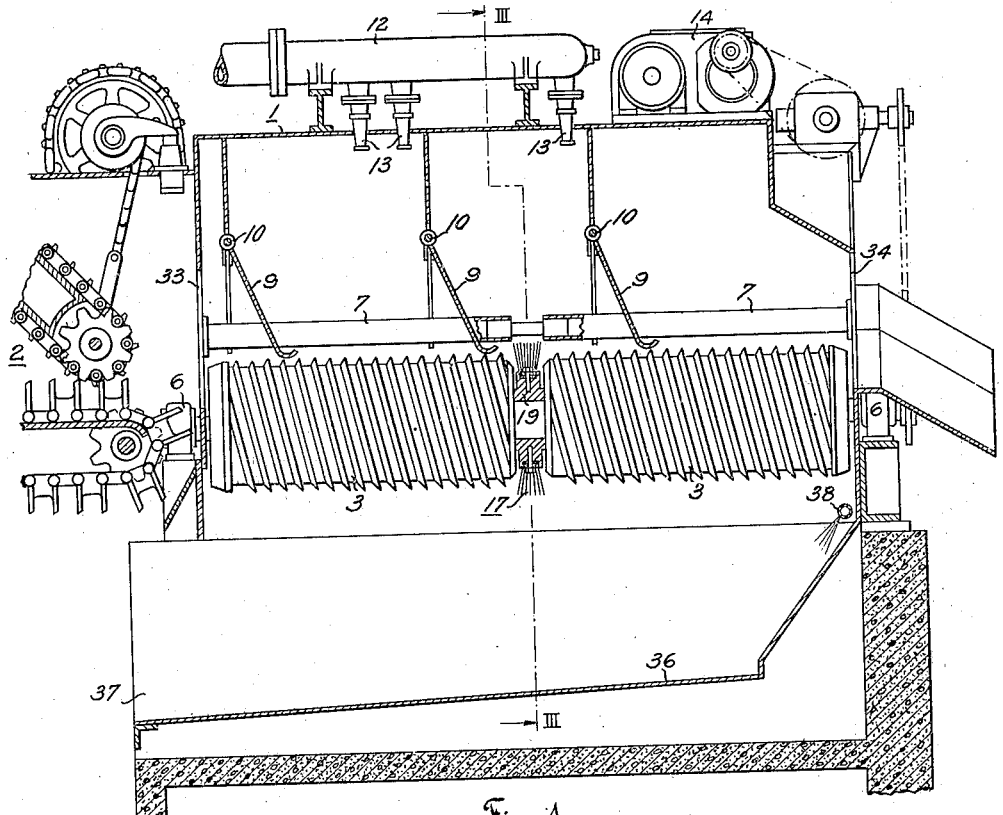
Fig. 1 is a vertical longitudinal view of a machine embodying the invention with a portion broken away to show a fragmentary section on the line I—I of Fig. 10.

The machine shown in the drawing consists of a housing 1 mounted on a suitable foundation. At the feed end of the housing, as shown in Fig. 1, is a feed means 2, the details of which form no part of the present invention. The feed means 2 is arranged to feed logs or other objects into the machine. A pair of rolls, consisting of a threaded roll 3, and a fluted or otherwise sharply roughened roll 4, are keyed on shafts 5 mounted in bearings 6 at opposite ends of the housing 1 in parallel, horizontal, close-spaced relation as shown in Figs. 1–4. It will be understood that the threaded roll 3 and fluted roll 4 may be replaced by any functionally equivalent elements providing relatively inclined moving surfaces defining an upwardly open valley, and having a surface configuration that will provide on the one hand a splined or ridged log-engaging surface in which the ridges are parallel at the axis of the logs and will tend to rotate a log in tangential engagement therewith, and on the other hand a log-engaging surface having threads or edged prominences inclined to the axis of the log which will tend to rotate and longitudinally move a log in engagement therewith and having a differential of surface speed relative thereto.

Figures 3, 4:
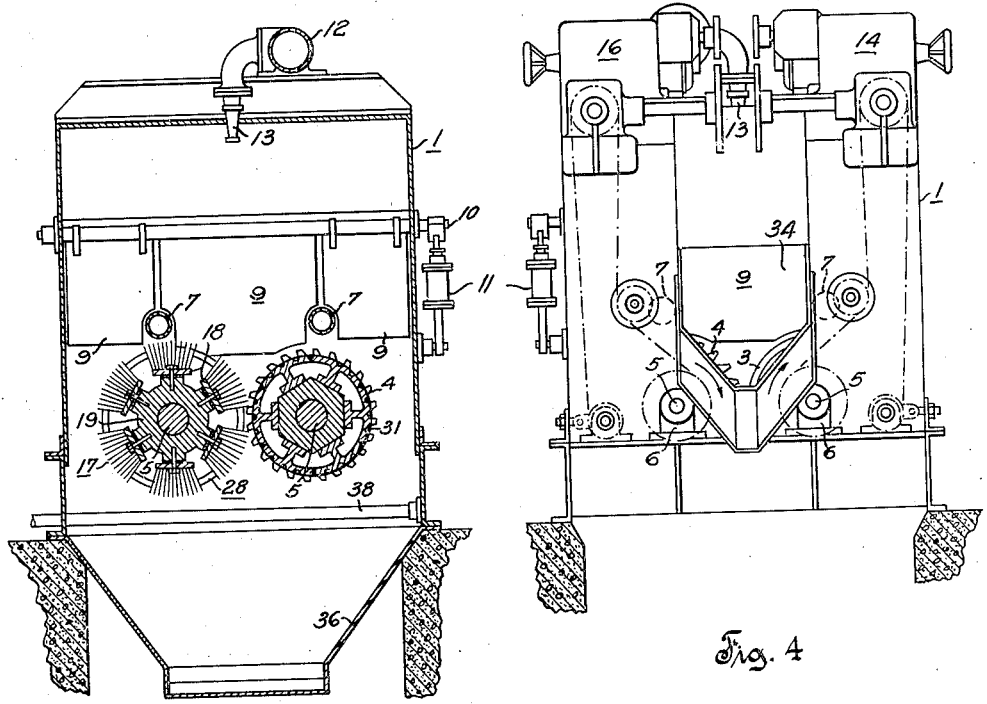
Fig. 3 is a cross-section through the machine on the line III—III of Fig. 1.
Fig. 4 is a vertical end elevation of a machine from the discharge end.
Figure 5:
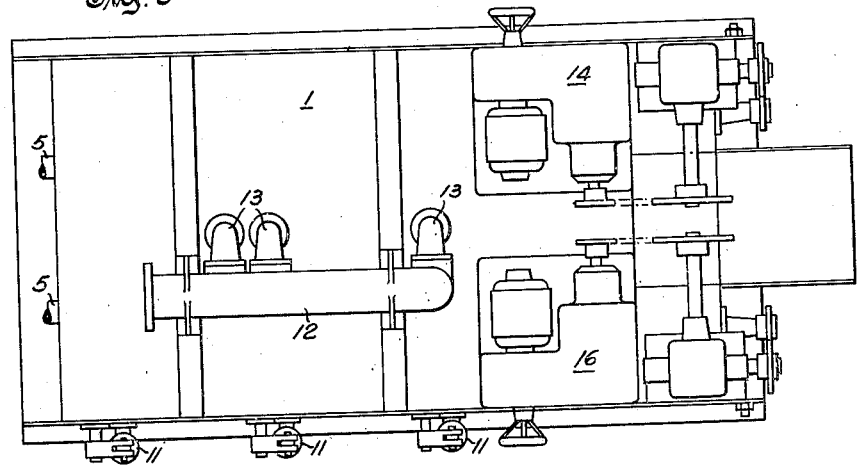
Fig. 5 is a top elevation of a machine.

A pair of guard rails 7 are secured in housing 1 above rolls 3 and 4, respectively, as shown in Figs. 1, 3 and 4. A series of baffle and pressure plates 9 are oscillatably supported on trunnions 10 journaled in the housing 1, one of said trunnions being operatively associated with a crank and dashpot mechanism 11 as shown in Figs. 3, 4 and 5, for reasons to be discussed hereinafter. On the housing 1 at the top is carried a hydraulic manifold 12 having a series of nozzles 13 for directing streams of water or other fluid at high velocity vertically downward between said rolls at spaced points.

A drive means (shown in Figs. 4 and 5), which may consist of a suitable variable speed drive transmission 14 with chain drive to the shaft 5 of the roll 3 and a second variable speed drive transmission 16 with a chain drive to the shaft 5 of roll 4, may be mounted on the housing 1. These separate drives 14 and 16, may be replaced by any suitable known means for driving the shafts 5 at variable speeds which will permit the shafts 5 and rolls 3 and 4 to be driven at different speeds. The speeds of rolls 3 and 4 should be separately controllable. The specific features of the means used to rotate rolls 3 and 4 form no part of the present invention, except inasmuch as the drive means are correlated to drive roll 4 in a direction to move its surface downwardly at the portion contiguous to roll 3 at a certain rate, and roll 3 in the same direction of rotation at a rate to give it a greater surface speed than roll 4.

Figure 10:
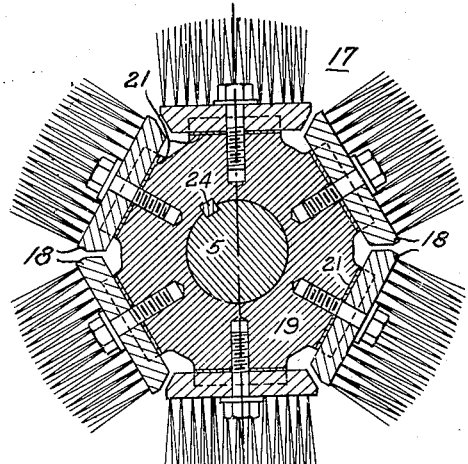
Fig. 10 is an enlarged fragmentary cross-section through a brush assembly, as shown in Fig. 3.

The roll 3 has its peripheral surface divided into two axially spaced portions separated by a gap in which a flexible cleansing tool 17 may be mounted. Tool 17 may consist of a segmental cylindrical brush consisting of segments 18 mounted on an intermediate hub element 19 in a manner to provide for radial adjustment, for example by the use of shims 21 as shown in Fig. 10. The tool or brush 17 projects through the gap between the spaced roll surface portions radially beyond the threaded surface of the said roll 3.

Figure 2:
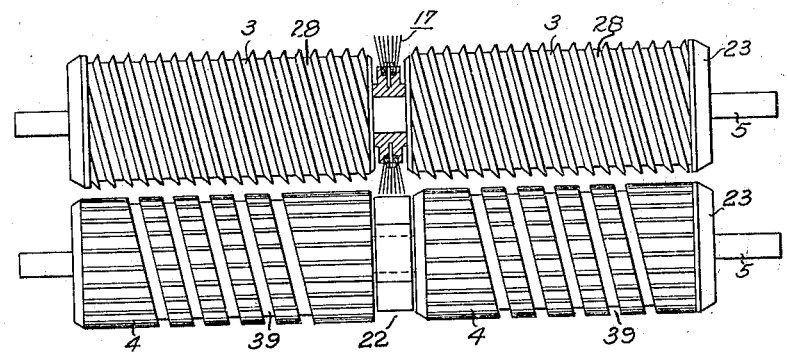
Fig. 2 is a detail top elevation of a pair of rolls in operative juxtaposition.
Figure 6:
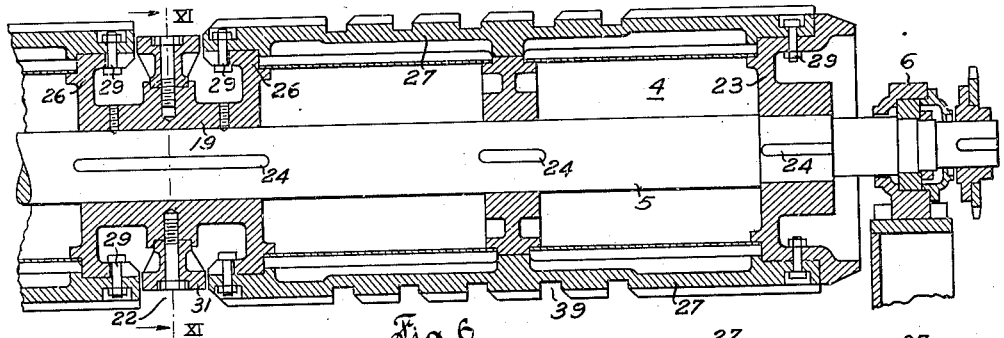
Fig. 6 is an enlarged fragmentary longitudinal sectional view of one of the rollers.

Opposite the tool or brush 17 the surface of roll 4 is relieved, as shown at 22 in Figs. 2 and 6, to provide operating clearance for the brush 17.

Figure 7:
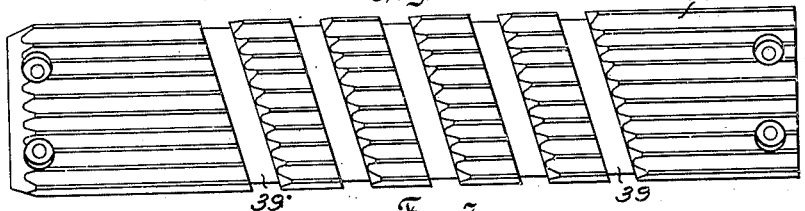
Figs. 7, 8 and 9 are detail views of roll shell segments.
Figure 8:
Figure 9:
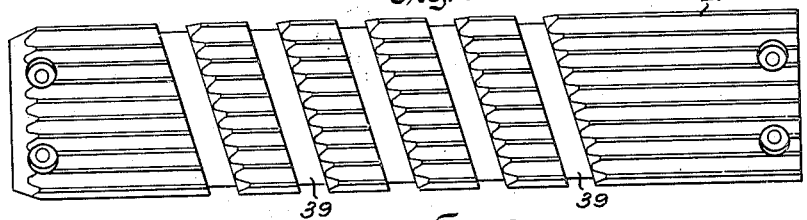

In order to provide for the brush 17 and relief at 22 and also to provide an improved roll structure in which the roll shell or working surface may be removed for dressing or replacement independently of the roll shafts 5, the rolls may be built up of axially spaced end hubs 23, and intermediate hubs 19 having spaced flanges 26, keyed to the shafts as shown at 24 or otherwise suitably secured thereto in fixed driving relation. Roll shells consisting of fluted segments 27 on roll 4, or threaded segments 28 on roll 3 are formed by securing such segments to the end hubs 23 and flanges 26 as by bolts 29 as shown in Fig. 6. The segments 27 and 28 are not shown in Figs. 1 and 2. The threaded segments 28 and roll structure of roll 3 are, except for the surface configuration, the same as segments 27 and roll 4, as shown in Figs. 6–9. Detail views of exemplary fluted roll shell segments are shown in Figs. 7–9. In the device as shown, twelve sixty-degree segments are used to form each divided roll surface. Segments of any angular size may however be used in any obvious manner to form the built-up roll.

Figure 11:
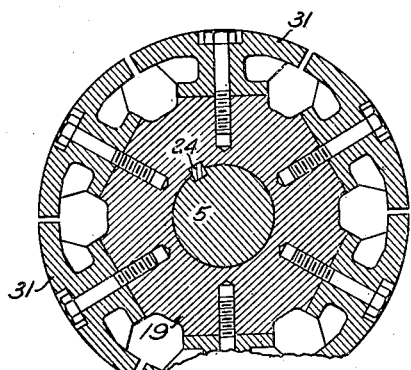
Fig. 11 is an enlarged cross-sectional view taken on the line XI—XI of Fig. 6.

Between the flanges 26 of the hub 19 the hub may be formed to receive segmental pieces 18 of the brush 17 as shown in Fig. 10, or segmental filler pieces 31 as shown in Fig. 11 to provide the proper clearance for brush 17.

The casing 1 may be provided with a log receiving opening 33 between the log feeding means 2 and the valley between rolls 3 and 4. A log discharge opening 34 may be provided at the opposite end of casing 1. The lower part of the casing may be formed as an inclined bark and water trough 36 having a discharge opening 37. At the upper end of the inclined bark and water trough a flushing water inlet 38 may be provided to flush out the trough and prevent any building up of bark particles and strips under the rolls. Non-annular grooves 39 may be formed in the surface of roll 4 to provide a ready path for clearance of bark and water from the valley between rolls 3 and 4.

The machine operates as follows. Driving means 14 and 16 rotate rolls 3 and 4 at predetermined speeds, preferably in the directions shown by the arrows in Fig. 4, that is in the same direction, with roll 3 operating at a higher speed than roll 4. It will be noted that the fluted or other roughened surface of roll 4 is sharpened in such a manner as to present advancing sharp edges to the log. Feeder 2 introduces a roughly cylindrical log, preferably a short length such as is commonly used in pulp wood stock in paper manufacture, through opening 33. The log enters the valley between rolls 3 and 4. At least as soon as the log leaves the feeder 2 the rolls 3 and 4 take control and rotate the log in a counter-clockwise direction as shown in Fig. 4. The cutting edges of roll 4 mark and break the bark and urge the log downwardly and against roll 3, and the sharp thread of roll 3 acts not only to cut into the bark at an angle to the cuts made by roll 4; but, since roll 3 rotates at a higher surface speed than the log, the thread acts to urge the log to travel longitudinally toward the discharge opening as it rotates. Water or other fluid is supplied at high pressure to hydraulic manifold 12. Nozzles 13 direct a series of jets of water at high velocity downward toward the opening between rolls 3 and 4. These jets strike the upper surface of a rotating and advancing log forcing it firmly against the rolls 3 and 4 and acting to mechanically remove the bark, the removal of bark being facilitated by the cutting and breaking action of the surfaces of rolls 3 and 4. After passing one or more jets which will have removed all or most of the bark, the log encounters the brush 17. Since relative tangential motion is occurring between the surfaces of the log and roll 3, the brush 17 will have a brushing action on the partially decorticated log which acts to remove or loosen any slimy residue, or the material known in the paper pulp industry as "red tail." After the brushing has begun the log encounters another fluid jet. This jet not only washes away material loosened by the brushing action but acts to hold the log down against the action of the brush after the trailing end of the log has cleared the jet located in advance of the brush. Thus it will be seen that the spacing of fluid jets before and after the brush cooperates to cause reliable efficient action of the machine. If it were not for these jets, as the log passed the brush with no jet acting on it, the brush would tend to lift the log partially off the rolls reducing the conveying and log rotating effect of the rolls and possibly canting the log in the valley between the rolls. This might cause stoppage of the log and a following log might jam under the trailing end of a stopped log causing a serious jam in the machine.

As the logs pass through the machine the swingable baffle plates 9 engage their upper surfaces regardless of log size. The weight of the plates aids gravity and the jets in holding the logs in proper engagement with the rolls and prevents splashing of water from the jets endwise through the log receiving and discharge openings directing all splash and flow downward into the trough 36. The baffle plates may be urged downwardly and prevented from violent banging by spring and dashpot mechanism 11 or other suitable biasing and snubbing devices. Water and bark particles tending to accumulate in the valley between the rolls are allowed ready egress through discontinuous grooves 39. The grooves 39 are made non-annular to prevent wrapping of strips of dislodged bark in the grooves. The filler blocks 31 in the clearance space 22 act to restrict the clearance between brush 17 and roll 4 to prevent wrapping of bark strips in the unavoidably annular space 22.

The novel built-up structure of the rolls not only provides a unitary driven roll in which a brush or other cleaning tool may be mounted, but allows a relatively light, hollow roll with working shell segments which may be removed for grinding or replacement without disturbing the shafts or driving mechanism of the machine.

The placing of the brush 17 on the threaded roll does away with the necessity of a separate brush driving mechanism. Adjustable mounting of the brush segments 18 provides for expanding the brush as wear occurs and also for adjustment to the most efficient brush diameter for the type of wood being handled.

It will be seen that the threaded roll 3 with built-in brush 17 forms a cleaning and conveying device on a single shaft which may be useful for conveying and cleaning of material pieces other than logs, for it will have advancing and cleaning action on at least one face of any piece of material held against it in such a manner as to cause relative tangential motion between the engaged surfaces and permit longitudinal movement of the piece by action of the threads. Where used in a log debarking machine, as shown, the thread pitch and brush width and the speeds of rolls 3 and 4 may be so chosen that the entire surface of any log of a size that the machine is designed to handle will be covered by the helical path of the brush.

It will be understood that while a specific embodiment of the invention has been shown in the drawing and described in the specification, the invention is intended to include such modifications and equivalents as may readily occur to persons skilled in the art within the scope of the appended claims.

It is claimed and desired to secure by Letters Patent:

1. A log rotating roll comprising a shaft, a pair of end hub members keyed to said shaft in axially spaced relation, an intermediate hub member keyed to said shaft intermediate said end hubs, axially spaced flanges on said intermediate hub member, a plurality of segmental roll shell elements removably secured to said end hubs and said intermediate flanges, said roll shell elements being arranged in two annular groups axially spaced from each other at said intermediate hub member to form a cylindrical roll having a gap intermediate the longitudinal surface thereof, and tool holding means on said intermediate hub member to accommodate a log treating tool in said gap.

2. A log rotating roll comprising a shaft, a pair of end hub members keyed to said shaft in axially spaced relation, an intermediate hub member keyed to said shaft intermediate said end hubs, axially spaced flanges on said intermediate hub member, a plurality of segmental roll shell elements removably secured to said end hubs and said intermediate flanges, said roll shell elements being arranged in two annular groups axially spaced from each other at said intermediate hub member to form a cylindrical roll having a gap intermediate the longitudinal surface thereof, and tool holding means on said intermediate hub member to accommodate a log treating tool in said gap, and an adjustable diameter brushing tool mounted on said tool holding means and projecting radially through said gap.

3. A log debarking machine comprising a pair of rotatably mounted parallel rolls for receiving and rotating a log supported thereby in parallel tangential relation, one of said rolls being formed with a sharply fluted surface and another of said rolls being formed with a threaded surface, power transmission means operably connected with said rolls and constructed and arranged for rotating said rolls at substantially different rates of peripheral speed for causing said rolls to cooperate in imparting simultaneous rotational and longitudinal movement to a log so supported relative to said rolls, and a cleaning tool mounted in angularly fixed relation on said threaded roll and projecting radially beyond the surface thereof to clean a helical strip of the surface of a log so supported in passing, said threaded roll having its working surface divided into at least two longitudinally spaced portions, and said cleaning tool being a generally cylindrical brush concentrically mounted between said sections for rotation therewith.

ERNEST C. SHAW.

REFERENCES CITED

The following references are of record in the file of this patent:

UNITED STATES PATENTS

| Number | Name | Date |
|---|---|---|
| 1,277,808 | Witham | Sept. 3, 1918 |
| 1,280,789 | McLennan | Oct. 8, 1918 |
| 1,300,748 | Lombard | Apr. 15, 1919 |
| 1,361,463 | Hohenstein | Dec. 7, 1920 |
| 1,379,768 | Larson | May 31, 1921 |
| 1,456,328 | Moravec | May 22, 1923 |
| 1,473,582 | Leedom | Nov. 6, 1923 |
| 1,556,016 | Morrall | Oct. 6, 1925 |
| 2,015,936 | Hokonson | Oct. 1, 1935 |
| 2,261,069 | Martin | Oct. 28, 1941 |
| 2,338,136 | Shaw et al. | Jan. 4, 1944 |

FOREIGN PATENTS

| Number | Country | Date |
|---|---|---|
| 369,249 | Germany | Feb. 16, 1923 |